US007455435B2

(12) United States Patent  
Mathews et al.

(10) Patent No.: US 7,455,435 B2
(45) Date of Patent: Nov. 25, 2008

(54) HIGH SPEED DATA INTERFACE TO THE AC POWER LINE THROUGH A STANDARD LIGHT BULB SOCKET

(75) Inventors: David K. Mathews, Fort Worth, TX (US); Alfred C. Griffin, Hillsboro, TX (US)

(73) Assignee: RadioShack Corporation, Fort Worth, TX (US)

( * ) Notice: Subject to any disclaimer, the term of this patent is extended or adjusted under 35 U.S.C. 154(b) by 455 days.

(21) Appl. No.: 10/925,467

(22) Filed: Aug. 25, 2004

(65) Prior Publication Data

US 2006/0033454 A1 Feb. 16, 2006

Related U.S. Application Data

(60) Provisional application No. 60/601,074, filed on Aug. 12, 2004.

(51) Int. Cl.
*F21V 17/00* (2006.01)
(52) U.S. Cl. .................... 362/441; 362/433; 362/444; 362/378
(58) Field of Classification Search .............. 362/443, 362/437, 441, 444, 358, 633, 632, 184, 378
See application file for complete search history.

(56) References Cited

U.S. PATENT DOCUMENTS

| | | | | |
|---|---|---|---|---|
| 5,432,500 | A | * | 7/1995 | Scripps ................. 340/628 |
| 5,980,057 | A | | 11/1999 | Christie ................. 362/86 |
| 6,324,311 | B1 | | 11/2001 | Gann ................. 382/312 |
| 6,812,970 | B1 | * | 11/2004 | McBride ................. 348/372 |
| 2003/0197807 | A1 | | 10/2003 | Wu ................. 348/375 |
| 2003/0210340 | A1 | * | 11/2003 | Romanowich ................. 348/272 |

OTHER PUBLICATIONS

"TMS320DA180 Network Audio Prcoessor," Product Bulletin, Texas Instruments, Inc., 2pp. 2003.
INT5200 "Single Chip Power Packet (TM) Transceiver" Technical Reference Manual, No. 24002232 Rev.6 2004, Intellon Corporation, used with permission.
"HomePlug 1.0 Technology-White Paper," 12pp. , HomePlug Powerline Alliance, Inc., www.homeplug.org., c.2001.
Gardner, Steve; Markwalter, Brian; Yonge, Larry: "HomePlug Standard Brings Networking to the Home," Communication Systems Design Magazine, vol. 6, No. 12, Dec. 2000; reprint available at: www.commsdesign.ccom/main/2000/0012.feat5.htm.

(Continued)

*Primary Examiner*—Tuyet Vo
(74) *Attorney, Agent, or Firm*—Whitaker, Chalk, Swindle & Sawyer, LLP; Stephen S. Mosher

(57) ABSTRACT

A data receiving or transmitting device, having data receiving or transmitting capability, is coupled respectively from or to an AC power line through a standard light bulb socket. In one aspect, a data interface includes a data receiving device that may be configured for extracting data encoded for transmission or encoding data to be embedded and transmitted along the AC power line branch circuit. In another aspect a data receiving device includes a loudspeaker, an amplifier, and a data decoder coupled to the AC power line for playback of audio program material communicated to the device along the power line. The device screws into a light bulb socket for a "no-tools" installation.

14 Claims, 3 Drawing Sheets

OTHER PUBLICATIONS

"PowerPacket (TM) Primer," White Paper, 5 pp. Rev. 20, 2001; Intellon Corp.; www.intellon.com.

"PowerPacket (TM) INT 5130 Chipset," Product Brief, 3pp., 2004; Intellon Corp., www.intellon.com.

"X10 Powerline Carrrier (PLC) Technology," White Paper, 5pp., Aug. 2004; www.x10.com.

"The UPB System Description," Excerpt, pp. i,ii and 1-4; Version 1.1, Sep. 19, 2003; Powerline Control Systesm, Northridge, CA.

"X-10 to UPB (TM) Migration Document," Excerpt, pp. i, ii and 1-3; Version 1.1, Sep. 25, 2003; Powerline Control Systems, Northridge, CA.

\* cited by examiner

HIGH SPEED DATA INTERFACE TO THE AC POWER LINE THROUGH A STANDARD LIGHT BULB SOCKET

CROSS-REFERENCE TO RELATED APPLICATION

The present U.S. patent application claims priority from earlier filed U.S. Provisional Patent Application Ser. No. 60/601,074, filed Aug. 12, 2004 and entitled "High Speed Data Interface To The AC Power Line Through A Standard Light Bulb Socket."

BACKGROUND OF THE INVENTION

1. Field of the Invention

The present invention generally relates to high speed data communication via the AC power line and, more particularly, to providing access to a high speed data communications network on the AC power line through a standard light bulb socket or receptacle.

2. Background and Description of the Prior Art

The development of the technology for high speed or broadband data communication on the AC power line has advanced to the point where it is readily available for use in and with consumer products that can be installed and used without having to install wiring and without having to rely on batteries as a source of power. The technology is currently known as "broadband powerline" or "BPL," or "powerline communication" or "PLC." Within these categories, the technology discussed herein below is the subcategory of so-called "in-home" or "in-building" BPL or PLC. However, the apparatus necessary for interfacing consumer products with the AC power line has only been developed to a limited degree. What is needed are innovative designs for devices that obtain electrical power from the AC power line and utilize a low cost high speed data interface in a power line communications system for supplying signals required by such devices.

Prior art solutions to this problem typically utilize a standard AC plug inserted into a standard AC receptacle for interfacing a consumer device to the AC power line. This works for devices located near the floor (in the typical residence), devices connected to a line cord, or devices that have no limitation as to where access to the AC power line is provided. However, there is another class of devices that are not well-adapted to this particular line cord and plug/receptacle interface, that may be mounted in a ceiling or on a wall near the ceiling or in which a line cord is not supplied. Some examples of this class of devices include (a) entertainment devices such as loudspeakers; (b) comfort devices such as HVAC sensors and controls, air filtering and conditioning; (c) security apparatus such as motion and proximity sensors, sound sensors or cameras; (d) communication terminal equipment; and the like.

Besides the conventional wall outlet or receptacle for accessing the AC power line, the other standard connection mechanism for connecting a device to the AC power line is the light bulb socket. Light bulb sockets are available in a variety of types and sizes. The most common is the standard medium lamp receptacle used for installing incandescent light bulbs having the well-known threaded medium lamp base. The medium lamp base and receptacle provides two electrical contacts and is rated for device power requirements of up to 300 watts. The threaded portion of the base or receptacle (the "shell"), is connected to the neutral side of the AC line circuit and the center contact of the base or receptacle is connected to the line or "hot" side of the AC line circuit.

There are several advantages of a light bulb socket as compared to a wall outlet, including (a) no line cord or plug is required—the device is simply screwed into the socket; (b) the mechanical connection is via a threaded connector, not one that relies on spring tension in the contacts of the connector to maintain a tight, mechanically secure connection; and (c) a light bulb socket is likely to be located in a wider variety of places and is thus more versatile and adaptable to a variety of devices that require both AC power and a reliable high speed data access.

Loudspeakers are typical of the kind of device that ordinarily require wiring to convey the sound signals to them. In the case of so-called "powered speakers," especially suitable for remote or extension speakers, AC power wiring is also usually required for their operation. Thus, the installation of extension speakers or ceiling speakers or surround sound speakers in an existing home environment requires that wiring for the AC power or for the audio signal or both be installed before the speakers may be used. Installation of such wiring is often a difficult and expensive task that typically requires the skills of an electrician to install the wiring properly, safely, and to accommodate local building codes. As a result, to avoid the cost and inconvenience, speakers may often be installed by non-electricians with haphazard wiring, often in unsightly fashion.

For example, several solutions exist in the prior art for coupling a powered loudspeaker system to the AC power line. This includes the traditional one of running the audio signal wires from the audio signal source through the wall or along the wall or baseboard to the extension speaker. In another example of a solution disclosed in U.S. Pat. No. 5,980,057 issued to Borchardt, et al., a speaker assembly adapted to be installed in a light bulb socket is equipped with an FM wireless receiver. The FM receiver receives broadcast signals over a modulated RF carrier in the 900 MHz band. The FM receiver demodulates the sound signal for play back via an amplifier coupled to the loudspeaker. However, the FM receiver must lock to a particular station or channel, it has a limited range because of the restrictions on devices operating in the 900 MHz band, and is susceptible to interference from broadcast FM stations operating in the same geographical area. This analog technology for conveying the audio signal is also susceptible to interference in the form of electrical noise and transients that are often present on the AC power line. By contrast, the digital modulation technologies are much more immune to interference that is largely comprised of such amplitude disturbances in the AC waveform. What is needed is a speaker unit that obtains the signals by a more robust and interference-free system than is available with analog FM modulation of an RF carrier, whether the medium is wireless broadcast or a power line carrier system.

In another example, disclosed in U.S. patent application No. US 2003/0197807 filed by Wu, a surveillance unit is mounted in a light socket and receives power from the light socket. Video data from a camera in the surveillance unit and/or audio data from a microphone may be sent via a wireless transceiver or via a power line network to a control or display location. The surveillance unit may include a speaker for playing audio information. However, the disclosed device is essentially a surveillance device which transmits information from its location via some undefined wireless or power line communication apparatus. There is little or no disclosure or teaching of transmitting or receiving and processing high speed data for use in data terminal devices connected to the AC power line via a lamp socket, the use of a lamp socket as a high speed data interface, or how the "audio information" is processed and communicated from a microphone or to a loudspeaker in a device connected to a lamp socket.

What is needed in this example of a loudspeaker system, or any other data receiving device, is a simple, inexpensive way to provide both AC power and robust, high speed data to the location of an extension or surround sound or ceiling speaker (or other data receiving device) without having to install new wiring. This would enable a person to simply install the speaker or other device in a suitable location just as he or she would install a light bulb. Such a system would also supply the audio or other signal to it via a power line communication system without having to run separate wiring to the installed speaker system or data terminal device. Besides being easy to install, the high speed data communications network on the power line that is used to convey the signal information (data) must be selected on the basis of robustness, resistance to the effects of interference, and able to maintain accepted standards for Quality of Service (QoS).

SUMMARY OF THE INVENTION

Accordingly, there is disclosed a data receiving device for coupling to an AC power line through a standard light bulb socket, comprising: a frame; a standard medium lamp base supported by the frame and for connecting to a branch circuit of the AC power line; an electrical device having signal terminals and supported by the frame; electrical circuitry having a first input and a first output, the first output coupled to the signal terminals for driving the electrical device; and a data receiver having a first input for receiving both AC power and a data signal from the AC power line, the second input coupled to the lamp base and a first output coupled to the first input of the electrical circuitry.

In one embodiment, the electrical device is a loudspeaker (or other transducer) which is fed audio (or other) signals by an amplifier (or other device) supported on the loudspeaker (or transducer) frame. The audio (or other) signals are decoded from high speed data obtained from the output of a HomePlug® receiver which receives and demodulates the audio (or other) signals transmitted as data along the AC power line by a compatible HomePlug® transmitter connected to an audio signal source. The data receiving device of the present invention may include a standard medium lamp receptacle that has a lamp bulb screwed into it. The lamp and the data receiving device both receive their operating voltages from the AC power line.

In other aspects of the invention, a data interface is disclosed for coupling a data terminal device to an AC power line branch circuit and for receiving and/or transmitting data encoded and transmitted along the AC power line branch circuit. The data interface comprises a standard medium lamp base coupled to the data terminal device for threadably engaging a standard medium lamp receptacle connected to the AC power line branch circuit, and a data receiving or transmitting interface circuit, i.e., a modem, in the data terminal device and coupled to the standard medium lamp base for decoding and extracting the data encoded and transmitted along the AC power line branch circuit to the data terminal device and/or for encoding and embedding data for transmission over the AC power line branch circuit from the data terminal device.

DETAILED DESCRIPTION OF THE INVENTION

In the detailed description which follows, the term "high speed" data will be taken to mean digital data transmitted at a relatively high data rate. Data rate is measured in bits per second. For example, a data rate of 10 million bits per second is usually expressed as 10 M bps. High speed data transfer in power line communications in currently available technologies is typically in the range of one to twenty Mbps. Technologies under development are pushing this range to 50 and 100 Mbps and beyond. In the exemplary embodiment to be described using the HomePlug® 1.0 technology, the maximum data rate is 14 Mbps. However, other versions of this technology, such as HomePlug AV (for audio-video), operating at data rates up to 60 Mbps and higher may soon be available. As compared with CCITT Group 3 or Group 4 facsimile transmission or the modems typically used for personal computers before the widespread availability of digital subscriber lines (DSL), for example, which operated at data rates up to 28 Kbps or 56 Kbps, data rates of 1.0 Mbps are "high speed." Thus, in the following description, any data rate over 1.0 Mbps will be considered "high speed."

A high speed data interface to the AC power line through a standard light bulb socket is disclosed enabling a simple, no-tools installation of data devices. This high speed data access concept may be adapted to a variety of entertainment, security, appliance and communication devices. In one described embodiment using a specially modified loudspeaker unit, a standard ceiling cannister lamp is converted to a loudspeaker system installation while retaining the lamp feature. No AC or other wiring needs to be installed. Circuitry in the modified loudspeaker unit is powered by the AC voltage from the wiring for the cannister light bulb socket. The circuitry includes a power supply that provides the operating DC voltages required by the circuitry. Audio signal is provided in the disclosed embodiment via the AC power line by a HomePlug® high speed data communication network system.

Figure 1:
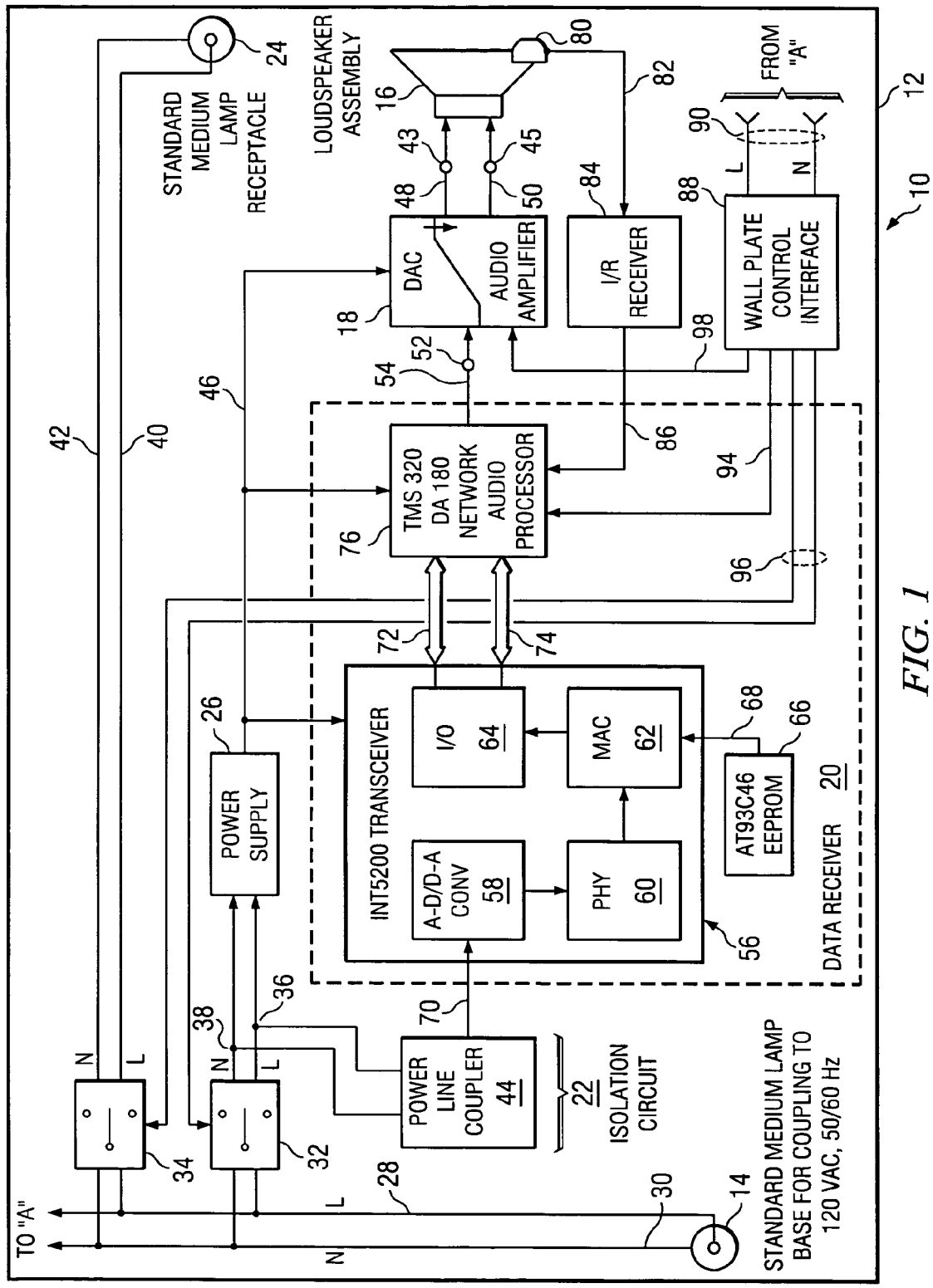
FIG. 1 illustrates a block diagram of one embodiment of a data receiving device for use with a power line data communications network coupled to an AC power line branch circuit via a standard light bulb socket according to the present invention.

Referring to FIG. 1, there is illustrated a block diagram of one embodiment of a data receiving device 10 for coupling to an AC power line branch circuit via a standard light bulb socket. The data receiving device 10 includes a frame 12 for supporting a standard medium lamp base 14, an electrical device 16, electrical circuitry 18, and a data receiver 20. In this embodiment, the frame 12 may be an extension of the frame of a loudspeaker, which is the electrical device 16. The frame 12 includes provisions for supporting the structures identified above. For example, the frame 12 of the loudspeaker may be configured as an enclosure, on which is mounted the standard medium lamp base 14, and within which is mounted the electrical circuitry 18 and the data receiver 20. The standard medium lamp base 14, a standard, threaded light bulb base used for ordinary incandescent light bulbs, is preferably insulated from the frame 12 to prevent short circuits or accidental contact with the electrically live portions of the lamp base 14. The electrical device 16 in this embodiment is a conventional loudspeaker driver having a frame, a cone, a magnet and a voice coil, along with a pair of signal terminals 43, 45. The signal terminals 43, 45 are provided to connect the output of an audio amplifier in the electrical circuitry 18 to be described herein below.

The electrical device or loudspeaker 16 includes a modified frame for supporting the structures of the disclosed embodiment, as will be further described. For example, in the described embodiment, the loudspeaker 16 maybe a full range, 5¼ inch diameter unit that can be mounted within a standard 5¾ inch diameter lamp cannister, as will be described herein below in further detail. In other embodiments, loudspeaker drivers having other diameters may be used depending on the specific application. For example, a 6½ inch loudspeaker may be used in larger canisters such as a standard 7¼ inch diameter unit. In another example (not shown), a frame 12 secured to a lighting fixture (not shown) of another type may be configured to support several small loudspeakers along with the data receiving device according to the present disclosure.

Continuing with FIG. 1, the standard medium lamp base 14 (hereinafter referred to as the lamp base 14) is connected to a line wire 28 and a neutral wire 30. The line and neutral wires 28, 30 may be connected to a power supply 26 via a first switch 32 and respective line and neutral nodes 36, 38. The power supply 26 provides several DC voltages to the electrical circuitry 18 and the circuits within the data receiver 20. The outputs of the power supply 26 appear on the power supply output bus 46, which may also be connected to the power line coupler 44 and other electrical circuitry to be described. The line and neutral wires at the output of switch 32 may also be extended from nodes 36, 38 to the input of a power line coupler 44.

The power line coupler 44 may include circuitry for isolating the data receiving device 10 from the AC power line (not shown) to which the lamp base 14 is connected. The isolation is provided to block the low frequency AC power line voltage and pass the data signals present on the AC power line. The power line coupler 44 may also include circuitry for suppressing conducted RF interference that may be generated in the data receiving device because of its digital circuitry. The power line coupler 44 may further include circuitry for suppressing transient signals that might be present on the AC power line from time to time. The techniques for providing the isolation filtering of conducted interference, and transient suppression functions are well known to persons skilled in the art and will not be further described herein. The output of the power line coupler 44 is provided along a signal path 70 coupled to a first input of the data receiver 20.

Figure 2:
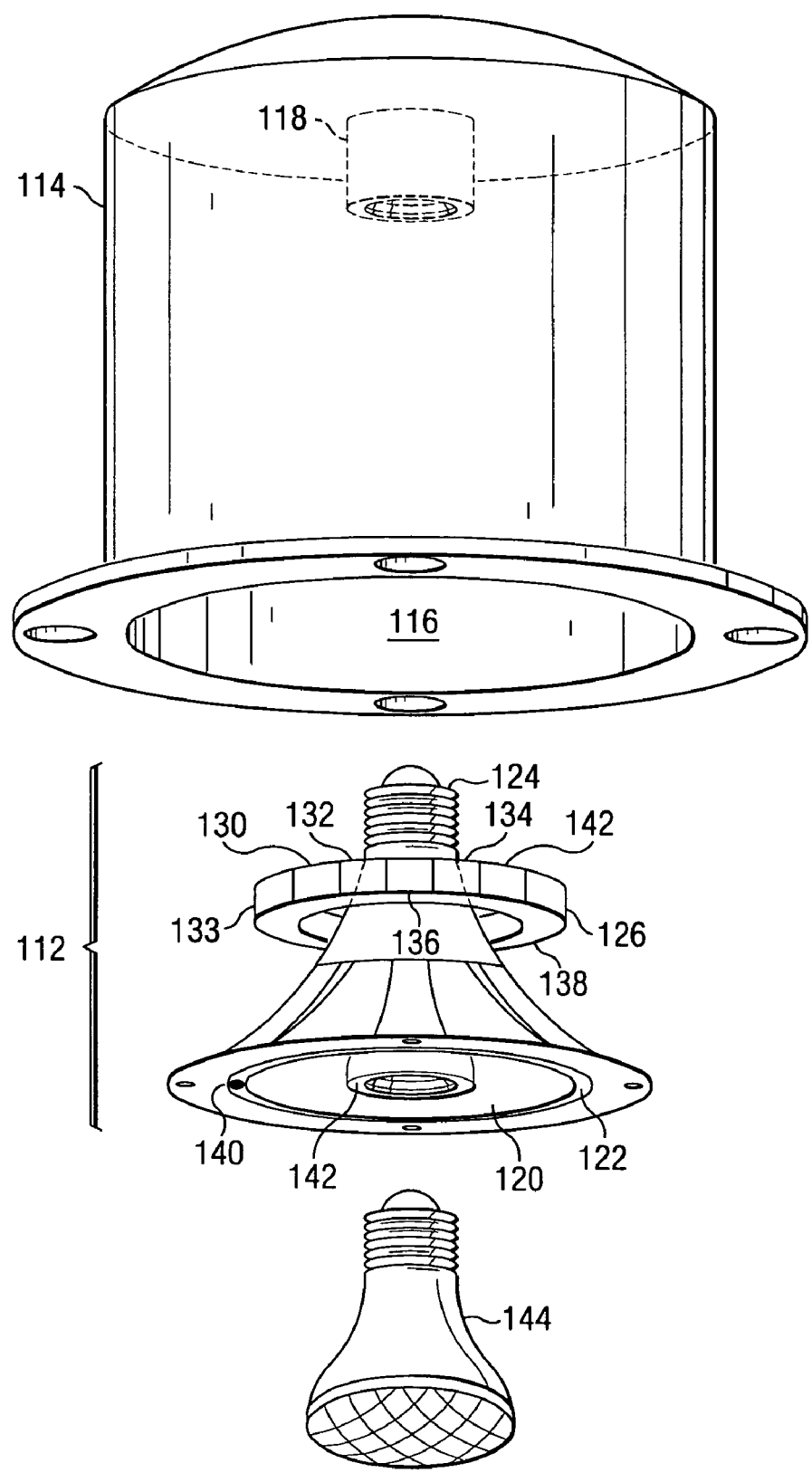
FIG. 2 illustrates an exploded pictorial view of the embodiment of the data receiving device of FIG. 1.

The data receiving device 10 may include a standard medium lamp receptacle 24, which is the familiar threaded light bulb socket used in a conventional floor lamp, desk lamp or ceiling lamp fixture, and is hereinafter referred to as a lamp receptacle 24 or lamp socket 24. The line and neutral wires 28, 30 may also be connected through a second switch 34 to the lamp receptacle 24 via wires 40, 42, to provide AC power line voltage to a lamp (not shown) that may be screwed into the lamp receptacle 24. The lamp receptacle 24 may be mounted on the frame 12 to accept a light bulb in the fixture containing the light bulb socket (not shown) into which the lamp base 14 of the data receiving device 10 is threaded. The relationship of the lamp receptacle 24 and the lamp base 14 is illustrated in FIG. 2, to be described herein below.

Continuing with FIG. 1, The electrical circuitry 18 may include, as in the described embodiment, a digital-to-analog controller (DAC) for converting digital audio signals, decoded in the data receiver 20 from the demodulated high speed data obtained from the power line at the lamp base 14 into base-band analog audio signals. The input to the DAC is coupled from a node 52, which is also connected via a line 54 to an output of the audio processor (to be described) in the data receiver 20. The output of the DAC may then be fed to the input of an audio amplifier adapted to driving the loudspeaker 16 via the lines 48, 50 connected respectively through the nodes 43, 45. In the disclosed embodiment a monaural DAC/amplifier combination is used. In a system configured for stereo outputs to two separate speakers, a type AIC23 Stereo CODEC available from Texas Instruments may be used, for example.

The data receiver 20 in the disclosed embodiment is a combination of a single chip power line network controller, an INT5200 manufactured by the Intellon Corporation of Ocala, Fla., 34482 and a single chip network audio processor, a TMS320DA180 (hereinafter referred to as the "DA180") manufactured by Texas Instruments Incorporated of Dallas, Tex. The INT5200 is used as a transceiver 56 and the DA180 is used as an audio processor 76. The transceiver 56 is coupled to the audio processor via a MII interface bus 72 and a MII two-wire bidirectional serial management (serial link) 74. The MII (media independent interface) interface bus 72 is part of a standard interface between the PHY (physical layer) and the MAC (media access control layer) of a distributed communications system (i.e., a network, such as the HomePlug® power line network). The PHY layer in the present embodiment is essentially provided by the transceiver 56 and the MAC layer is provided in the audio processor 76. The MII interface permits communication between the transceiver 56 and the microcomputer in the network audio processor 76 in accordance with the IEEE 802.3u standard.

The transceiver 56 (the Intellon INT5200 chip) provides the implementation of the HomePlug® power line network control, including the signal processing for the orthogonal frequency division multiplexing (OFDM) used in the HomePlug® system to provide a robust communication network in the presence of the substantial noise, interference and unpredictable line characteristics of a conventional AC power line. Also provided in the transceiver 56 are all analog front end and line interface, analog conversion, and signal processing functions. Further, the transceiver 56 provides an EEPROM interface and a number of quality of service (QoS) features required by the HomePlug® Specification. A complete description of the INT5200 is provided in The Technical Reference Manual for the INT5200 available from Intellon Corporation. In FIG. 1, the essential features of the transceiver 56 are shown and include an A-D/D-A converter 58, a PHY block 60, a MAC block 62, and an I/O block 64. The MAC block 64 is coupled to the MII interface described previously. An external EEPROM 66, an AT93C46, is coupled to the MAC block 62 via a signal path 68.

The DA180 chip used to implement the audio processor 76 illustrated in FIG. 1 includes a 10/100BT (Ethernet) MAC interface in addition to a DSP (digital signal processor) and a ARM® RISC (reduced instruction set computer) processor. It is well adapted to process audio content transmitted on networks and can provide streaming audio data formatted according to the MP3, WMA™ and other specifications. The MAC interface in the audio processor 76 is coupled via the MII interface with the transceiver 56. A brief description of the DA180 is presented in Product Bulletin No. SPRT266 available from Texas Instruments Inc.

The HomePlug® Specification 1.0 was chosen as a technology well-suited for the application illustrated for use in the disclosed embodiment. It provides the versatile, robust OFDM high speed data modulation scheme, an enhanced Ethernet-like protocol, and a substantial encryption method to provide reliable transmission of high speed data capable of handling streaming media, VoIP (voice-over-Internet protocol), etc. in a secure, encrypted channel with satisfactory QoS. The OFDM technique divides the data stream into two or more data streams, each having its own carrier and a lower bit rate. Each carrier is separated in frequency from the other carriers by an amount inversely related to the bit rate of its data stream. The carriers may be chosen from any one of up to 84 subcarriers, spaced equally within a range in frequency between 4.5 MHz and 21 MHz. Further, each carrier may be modulated differently. Thus, the bit streams are readily distinguishable and recoverable, which facilitates reconstruction of the original signal. The carriers may be modulated using QPSK (quaternary phase shift keying, which can use four phases of a carrier) or DBPSK (differential binary phase shift keying, which can use two phases of a carrier).

The protocol for regulating access to the channel in the HomePlug® system employs the well-known CSMA/CA (Carrier sense multiple access/with collision avoidance) method of testing the channel, using it if it is not in use, or waiting a random interval to try again if it is in use. This basic approach is enhanced in the HomePlug® system by adding priority levels, improving access speed, and other techniques. Encryption is applied by a 56 bit algorithm upon all the packets formatted for transmission so that all devices in the network are open to each other. However, the network is secure against devices outside the local network. Quality of service (QoS) is assured by a variety of features to reduce complexity, reduce delays, and ensure higher priority traffic is processed more efficiently. Thus, the HomePlug® Specification is one example of a local network communication scheme well adapted to providing high speed data to devices connected to the AC power line via a light bulb socket. Further details of the HomePlug® Specification 1.0, released June, 2001, are available from The HomePlug Powerline Alliance, Inc. at www.homeplug.org.

Several alternate embodiments of the data receiving device 10 are also illustrated in FIG. 1. An optional infrared receiver 84 may be coupled between a detector 80 mounted on the frame 12 of the loudspeaker 16 and an input to the audio processor 76 via a circuit 86. When used with an infra red remote control configured for controlling the data receiver 20, various control functions may be implemented. Such a feature is especially useful for data receiving devices mounted out of reach in a ceiling lighting fixture. In another alternate embodiment, a wall plate control interface may be coupled to an input of the audio processor 76 via a control bus 94 and to an input of the audio amplifier in the electrical circuitry 18 via a control bus 98. The wall plate interface may be implemented according to any of several power line communications standards, such as X-10, Universal Powerline Bus (UPB) and others, in which control of addressable devices connected to the AC power line occurs as low speed data transmissions synchronized with the zero crossings of the 60 Hz AC voltage. Various control functions, such as control of the volume, selection of program choices, and the like may be provided by a wall plate interface. The wall plate interface may also be used to provide switching of the AC power line voltages into the data receiving device 10 or the lamp receptacle 24. In the example shown in FIG. 1, a control bus 96 is provided to operate either the first switch 32 to control AC power to the data receiving device 10 or the second switch 34 to control AC power to the lamp receptacle 24. Operating AC voltage to the wall plate control 88 is supplied thereto via bus 90 connected to the line and neutral wires 28, 30.

Yet another alternate embodiment of the disclosed invention is illustrated in a portion of FIG. 1. A data interface is contemplated for coupling a data terminal device to the AC power line branch circuit, for receiving data encoded and transmitted along the AC power line branch circuit. The data terminal device, properly configured, may also encode and transmit data onto the AC power line branch circuit via the data interface. In one of its basic forms, the data interface comprises the standard medium lamp base 14, coupled to the data terminal device, i.e., the data receiving device 10 in FIG. 1. The standard medium lamp base 14 enables the data terminal device to threadably engage a standard medium lamp receptacle connected to the AC power line branch circuit. The data receiving interface circuit in the data terminal device is coupled to the standard medium lamp base for extracting the data encoded and transmitted along the AC power line branch circuit.

In another of its basic forms, the data interface may be configured for transmitting data. In this form, a data transmitting device (not shown, but similarly constructed as the data receiver using the disclosed INT5200 transceiver) may be coupled to the standard medium lamp base 14. Persons skilled in the art will readily appreciate the steps necessary to configure the INT5200 transceiver and the DA180 network audio processor in combination to function as a data transmitter for encoding audio signals output from a microphone, embedding them in a signal compliant with a HomePlug® modulation scheme, for example. Similarly, the data interface device may be configured for both receiving and transmitting high speed data, i.e., as a data modem, utilizing all of the capabilities of the INT5200 transceiver and the DA180 network audio processor. The foregoing example, configured for processing audio data for transmission and reception via the AC power line, is not intended to be limiting to audio applications but is illustrative of the basic structure of such devices.

Referring to FIG. 2, there is illustrated an exploded pictorial view of one embodiment of a data receiving device for use with a power line data communications network, according to the present invention. A system 110 including the data receiving device 112, a canister assembly 114, and a lamp bulb 144 is shown. The canister assembly 114 includes an interior portion 116 and a standard medium lamp receptacle 118. The data receiving device 112 includes a loudspeaker unit 120 having a frame 122 which supports a standard medium lamp base 124 on the back portion of the frame 122 of the loudspeaker unit 120, typically in the vicinity of the magnet assembly (not shown) of the loudspeaker unit 120. The frame 122 of the loudspeaker unit 120 may be modified further to support additional circuitry 126. The additional circuitry 126 may include an AC to DC power supply 130 (26 in FIG. 1) for providing the operating voltages needed by the additional circuitry 126. The additional circuitry 126 may further include an audio processor 133 (76 in FIG. 1) and a DAC/audio amplifier 132 (18 in FIG. 1) for driving the loudspeaker 120 when an audio signal is present. The additional circuitry 126 may preferably include a HomePlug® data receiver 134 (20 in FIG. 1) for demodulating data signals and providing digital audio data to the audio processor 132. In an alternative embodiment the additional circuitry 126 may include an infra red receiver 136 (84 in FIG. 1) connected to an infra red detector 140 (80 in FIG. 1) to facilitate remote control. An alternative embodiment may also include a wall plate control interface 138 (88 in FIG. 1) in the additional circuitry 126. In a typical unit the data receiver 112 is mounted in the interior 116 of the canister assembly 114. Further, a standard medium light bulb receptacle 142 is mounted in the center of the front of the loudspeaker, in front of the cone portion of the loudspeaker. A lamp bulb 144 may be installed in the lamp receptacle 142. The canister assembly may typically be mounted in a ceiling. In homes under new construction, such fixtures having standard medium lamp receptacles may be mounted in any surface of a room to adapt its location to the particular environment of the data receiving device that is planned for that location.

The lamp base 124 provides both AC power and data signals to the data receiving device 112. The AC voltages are coupled to the power supply 130 (not shown) in the additional circuitry 126 and are isolated from the data signals as previously described in conjunction with FIG. 1. In operation, the orthogonal frequency division modulation (OFDM) data signals are received from the lamp receptacle 118 through the lamp base 124 to the HomePlug® data receiver 134. After being demodulated in the HomePlug® data receiver 134, the data signals are decoded in the audio processor 133, converted, filtered and amplified in the DAC/audio amplifier 132, and coupled to the signal terminals (not shown in FIG. 2) of the loudspeaker 120 to produce the sound corresponding to the audio data. In a typical implementation the additional circuitry 126 may be integrated into a compact assembly for mounting upon the frame 122 of the loudspeaker unit 120. The loudspeaker selected for use may, e.g., be a wide-range 5¼" unit adapted to fit within the interior 116 of a standard 5¾" diameter or 7¼" diameter canister assembly 114. A 6½" loudspeaker driver may also be used in the 7¼" size canister. Such canister assemblies are commonly found in modern home ceiling lighting fixtures and are readily available from numerous suppliers. It will be appreciated that the data receiving device 112 illustrated in FIG. 2 provides for the delivery of both AC power and high speed data signals via the lamp receptacle 118 into the circuitry for the power supply 130, the DAC/audio amplifier 132, the audio processor 133, the data receiver 134, and the lamp receptacle 142. Operating voltages are also available to the alternate features including an infra red receiver 136 and the wall plate interface 138.

Figure 3:
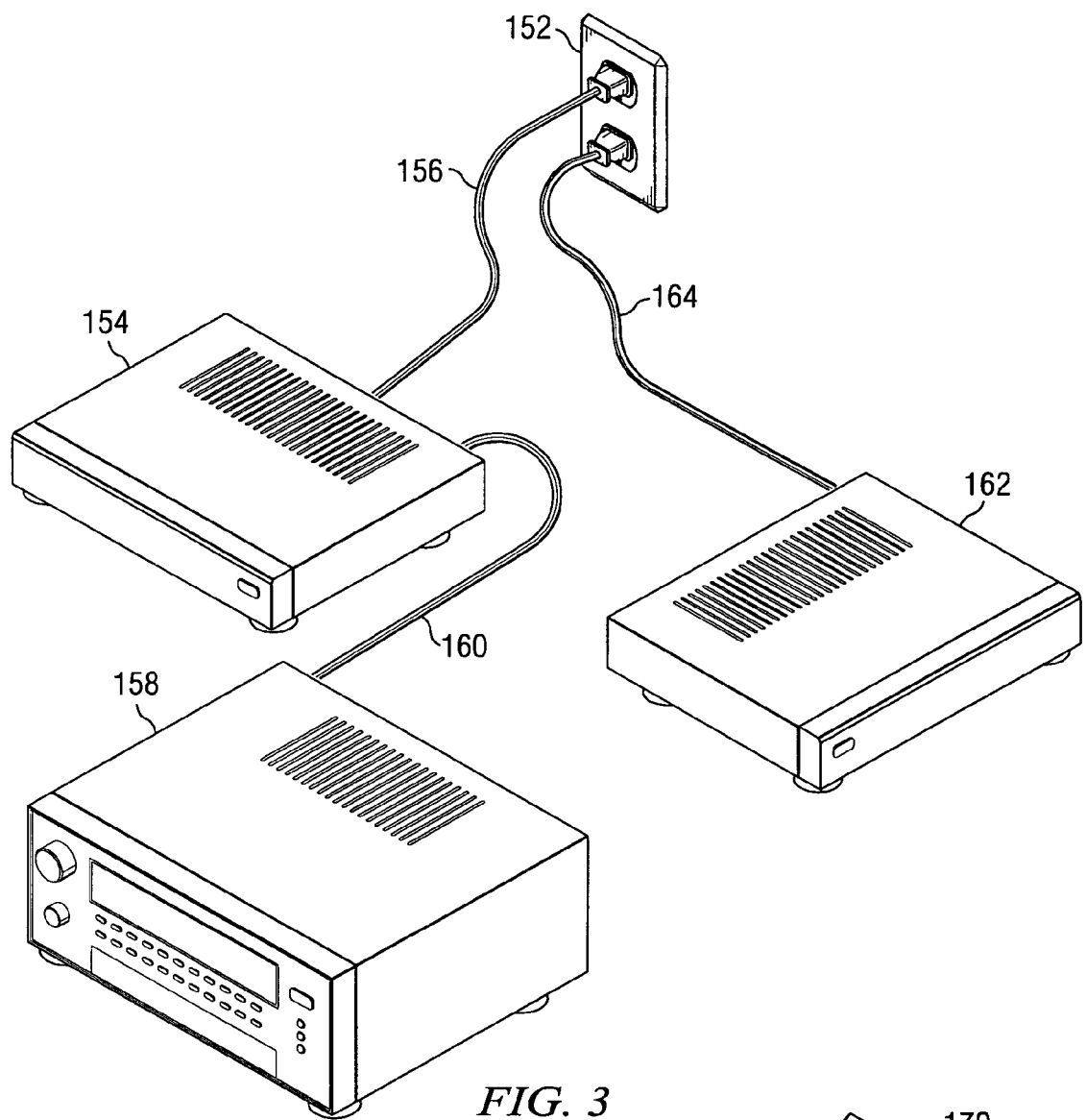
FIG. 3 illustrates a pictorial view of one embodiment of a system for providing data signals via a power line data communications network, for use with the data receiving device according to the present invention.

Referring to FIG. 3, there is illustrated a pictorial view of one embodiment of a system for providing data signals via a power line data communications network, for use with the data receiving device according to the present invention. A network apparatus 150 needed to provide the source signals and the data communications facilities is shown, including a conventional AC wall receptacle 152 connected to the power line. A HomePlug® transmitter 154 is connected via line cord 156 to one of the AC receptacles shown plugged into the wall receptacle 152. An audio source 158 is connected to an input of the HomePlug® transmitter 154 via an audio cable 160. In an alternative embodiment, an X-10 or UPB unit 162 may also be connected to the wall receptacle 152 via a line cord 164.

Figure 4:
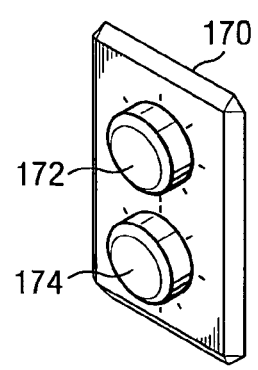
FIG. 4 illustrates a wall plate control that may be used with the embodiment of the data receiving device of FIG. 2.

A wall plate interface 170 having controls 172 and 174 mounted thereon is shown in FIG. 4. Control 172, for example, may control the volume heard through the speaker. Control 174, for example, may control the brightness of the lamp bulb (144 of FIG. 2) or make a selection of a program choice. The wall plate interface 170 may be mounted in the vicinity of the data receiving device 112 of FIG. 2. The X-10 or UPB system maybe used to provide control for the lamp bulb 144 installed in the lamp receptacle 142 of the data receiving unit 112 as shown in FIG. 2.

To summarize the described embodiment, a HomePlug® networking system is used to convey streaming audio data on the AC power line and through the lamp socket. The HomePlug® system is a robust, Ethernet-like, peer-to-peer network implemented using, e.g., low-cost, single chip products manufactured by Intellon and Texas Instruments. The audio signal is supplied from a HomePlug® transmitter as a high speed data signal (orthogonal frequency division multiplexing, or OFDM) conducted along the power line through a threaded, standard light bulb base on the loudspeaker unit and into the additional circuitry attached to the modified loudspeaker. The data signal is demodulated, decoded, and converted from digital to analog form for driving an audio amplifier, which outputs the signal to the signal terminals connected to the voice coil of the loudspeaker.

Several optional features may be incorporated into the modified loudspeaker. For example, an infrared receiver may be included to provide remote control of the volume or the audio selection. Similarly, control of the supply of AC voltage to the data receiving device or the light bulb may be controlled by a standard X10 or Universal Powerline Bus (UPB) system that provides low speed data communication synchronized with the zero crossings of the AC power line voltage waveform.

To install the units, one removes the light bulb from its canister and installs the modified loudspeaker into the receptacle of the canister unit. Then, replace the light bulb that was previously removed by screwing it into the standard socket in the front of the loudspeaker unit itself. In this way a loudspeaker is installed in a standard canister fixture without the need to install additional wiring and without using any tools.

Other electrical devices operating on high speed data maybe interfaced to the AC power line through a light bulb socket using the same concept and similar implementation. For example, high speed data for security devices such as cameras, motion, temperature, sound or proximity sensors, listening devices, automated appliance controls, communications devices such as modems, etc. may be coupled to and transferred along the AC power line to a terminating HomePlug® receiver through a standard light bulb socket.

In other configurations, canisters may be adapted for table or floor lamp use wherein the lamp unit may include a lamp in one canister and a loudspeaker in another canister. Alternatively, a lamp type base having two canisters may provide stereo sound by adding two loudspeakers, one for the left signal speaker the other for the right signal speaker.

A high speed data interface to the AC power line through a standard light bulb socket is described enabling a simple, no-tools installation of data devices. Such data devices may include, but are not limited to HVAC system controls, security apparatus (cameras, motion, temperature, sound and proximity sensors, listening devices), entertainment devices and loudspeakers, communications devices such as modems, and appliance controls. In one exemplary embodiment using a specially modified loudspeaker unit, a standard ceiling canister lamp is converted to a loudspeaker system installation while retaining the lamp feature. Thus, an extension, surround sound, or ceiling speaker may be installed in existing homes equipped with canister lighting without the need to install new wiring. Circuitry in the modified loudspeaker unit is powered by the AC voltage from the canister wiring. Audio signal is provided by a HomePlug®, high speed data power line communication network system.

While the invention has been shown in detail in only one of its forms, it is not thus limited but is susceptible to various changes and modifications and adaptation to other devices having data receiving capability without departing from the spirit thereof.

What is claimed is:

1. An apparatus for providing a data interface to an AC powerline through a standard light bulb socket, comprising:
    a data terminal device for coupling to an AC power line and processing data communicated along the AC power line; and
    a data interface for coupling the data terminal device to the AC power line via a standard medium lamp base, comprising:

a frame;

a standard medium lamp base supported by the frame and for connecting to a branch circuit of the AC power line;

an electrical device having signal terminals and supported by the frame;

electrical circuitry having a first input and a first output, the first output coupled to the signal terminals for driving the electrical device; and a data receiver having a first input for receiving both AC power and a data signal from the AC power line, the first input coupled to the lamp base, and a first output coupled to the first input of the electrical circuitry.

2. The apparatus of claim 1, wherein the frame comprises the frame of a transducer.

3. The apparatus of claim 1, wherein the frame comprises the frame of a loudspeaker.

4. The apparatus of claim 1, wherein the electrical circuitry comprises an audio amplifier preceded by a low pass filter.

5. The apparatus of claim 1, wherein the electrical device comprises a transducer.

6. The apparatus of claim 5, wherein the transducer comprises a loudspeaker.

7. The apparatus of claim 5, wherein the transducer comprises a plurality of loudspeakers.

8. The apparatus of claim 1, wherein the frame further includes a standard medium lamp receptacle supported thereon and coupled to the AC power line for receiving a lamp bulb therein.

9. The apparatus of claim 8, wherein the data receiving device is configured in combination with a loudspeaker system.

10. The apparatus of claim 9, wherein the loudspeaker system is configured as an extension speaker.

11. The apparatus of claim 9, wherein the loudspeaker system is configured as a unit of a surround sound speaker system.

12. The apparatus of claim 9, wherein the loudspeaker system is configured as an extension speaker for mounting at least partially in a ceiling or wall surface.

13. The apparatus of claim 8, wherein the electrical device comprises a loudspeaker, the electrical circuitry comprises an audio amplifier, and a wall-mounted control unit associated with a light switch assembly connected to the AC power line that maintains power to the electrical device and data receiver and provides control of the volume and source selection to the loudspeaker while including control of a lamp bulb connected in the standard medium lamp receptacle of the data receiving unit.

14. Sound reproduction apparatus responsive to data signals coupled through a light bulb socket, comprising:

a frame for a loudspeaker device;

a loudspeaker device supported by the frame, for reproducing audio signals decoded from data signals communicated on an AC power line;

a light bulb base supported by the flame; and a data interface device for coupling the loudspeaker device to the AC power line via the light bulb base;

wherein the data interface device comprises a data receiving interface circuit for decoding, extracting, and amplifying the audio signals from the data signals communicated through the AC power line.

* * * * *